United States Patent [19]

Blow

[11] Patent Number: 4,938,557

[45] Date of Patent: Jul. 3, 1990

[54] OPTICAL DEVICE

[75] Inventor: Keith J. Blow, Woodbridge, England

[73] Assignee: British Telecommunication public limited company, London, England

[21] Appl. No.: 193,285

[22] PCT Filed: Sep. 14, 1987

[86] PCT No.: PCT/GB87/00639
§ 371 Date: May 11, 1988
§ 102(e) Date: May 11, 1988

[87] PCT Pub. No.: WO88/02132
PCT Pub. Date: Mar. 24, 1988

[30] Foreign Application Priority Data

Sep. 16, 1986 [GB] United Kingdom ............. 8622314

[51] Int. Cl.$^5$ ........................... G02B 6/26; G02B 6/42
[52] U.S. Cl. ................................................... 350/96.15
[58] Field of Search ............... 350/96.15, 96.29, 96.33

[56] References Cited

U.S. PATENT DOCUMENTS 4,515,429 5/1985 Smith et al. .................. 350/96.13

OTHER PUBLICATIONS

Blow; "Nonlinear Effects in Optical Fibers and Devices"; IEEE Conference; May 1986.

Primary Examiner—William L. Sikes
Assistant Examiner—Robert E. Wise
Attorney, Agent, or Firm—Nixon & Vanderhye

[57] ABSTRACT

An optical device for use as an optical switch, optical amplifier or optical logic circuit comprises an optical waveguide such as a W profile optical fiber formed from an assembly of optically conductive media having different refractive indices, at least one of which is non-linear, whereby an optical signal with a single mode is guided or not guided along the waveguide in accordance with the intensity of the signal; and coupling means for coupling at least two optical signals into an input end of the waveguide. A Y-coupler is coupled with the optical waveguide to couple at least two optical signals into an input end of the waveguide. One of the optical signals may comprise a bias signal.

19 Claims, 5 Drawing Sheets

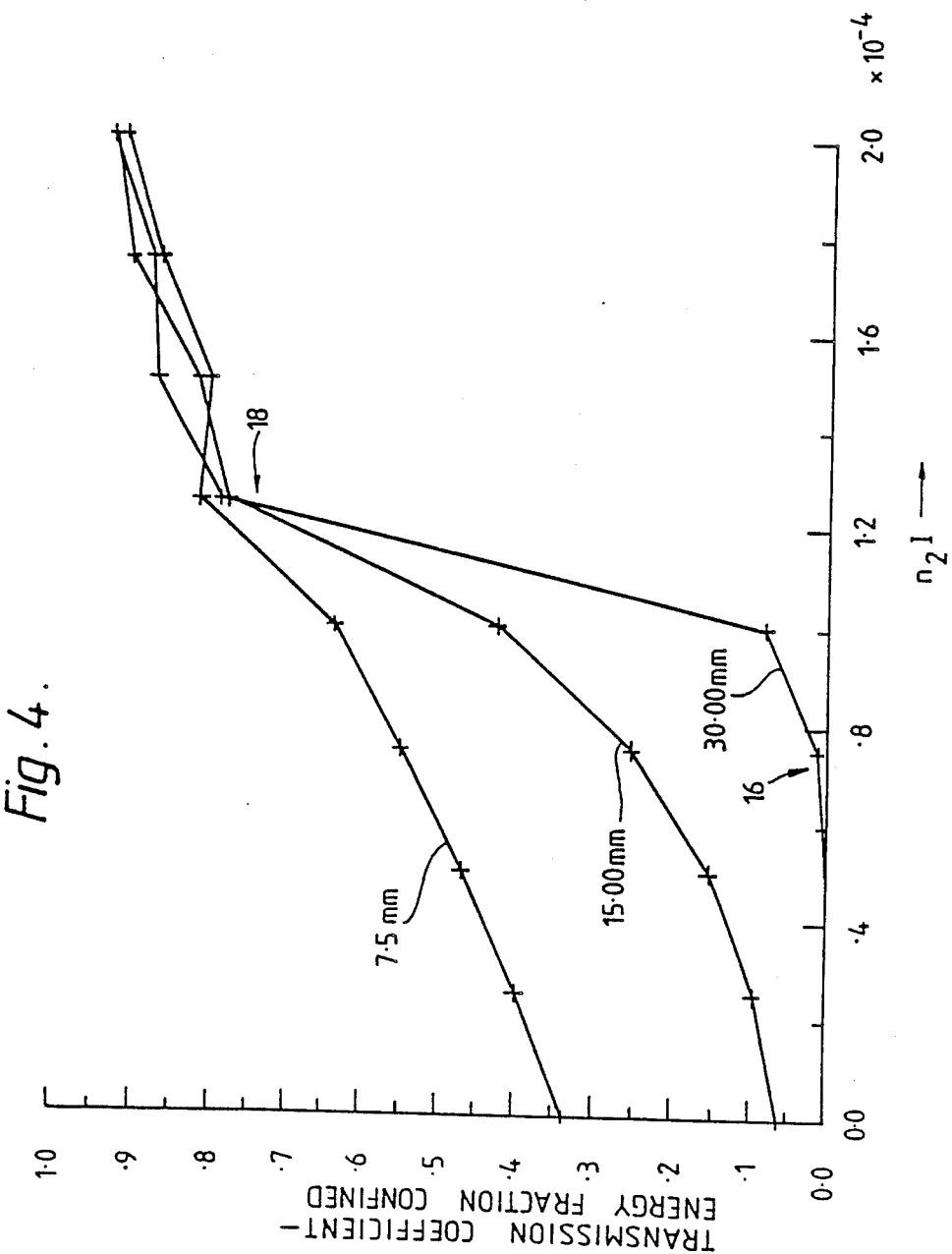

OPTICAL DEVICE

FIELD OF THE INVENTION

The invention relates to an optical device for example for use as an optical amplifier or optical switch.

BACKGROUND AND SUMMARY OF THE INVENTION

There is an increasing requirement in the field of optical communications and optical logic circuitry to develop simple optical components to achieve functions such as switching, logic operations, amplification and the like.

In accordance with one aspect of the present invention, an optical device comprises an optical waveguide formed from an assembly of optically conductive media having different refractive indices, at least one of which is non-linear, as hereinafter defined whereby an optical signal with a single mode is guided or not guided along the waveguide in accordance with the intensity of the signal; and coupling means for coupling at least two optical signals into an input end of the waveguide.

In accordance with a second aspect of the present invention, a method of operating such an optical device comprises injecting a first optical signal into the waveguide, the intensity of the first signal being such that the signal is substantially cut-off; and injecting a second optical signal into the waveguide with an intensity such that the resultant of the first and second signals has an intensity sufficient to be guided by the waveguide.

This invention use of the properties of inhomogeneous media having a non-linear refractive index such that the waveguide switches from a guiding to a non-guiding condition depending upon the intensity of the total incident light. This self-guiding property can be used in a number of different applications.

Preferably, the waveguide comprises at least three nested media, the two inner media having refractive indices in the guiding condition respectively greater and less than the refractive index of the outer medium, the refractive index of at least one of the inner media being non-linear.

Typically, the waveguide comprises a core, an inner cladding surrounding the core, and an outer cladding surrounding the inner cladding.

For example, a typical optical fibre has a core with a refractive index higher than that of the outer cladding, and an inner cladding with a refractive index lower than the outer cladding.

An example of a suitable optical fibre is a fibre having a W profile which has a fundamental mode cut-off which can be moved to the desired wavelength by suitable design. Silica has a self-focussing Kerr coefficient which would require powers of about 100 kW. Other materials which could be used include doped silica and silica W capilliaries containing highly non-linear organic materials.

By "non-linear" we mean that the refractive index of the medium ($n_1$) varies with intensity. Typically, this will be according to the formula:

$$n_1 = n_0 + n_2|E|^2$$

where $n_0$ is the linear refractive index of the medium, $n_2$ is the Kerr coefficient, and $|E|^2$ is the intensity of the incident light.

Typically, $|E|^2 n_2$ is very much less $n_0$ and thus the non-linear effect is only apparent at high intensities. The invention is concerned with waveguides where the intensity of the incident light and the Kerr coefficient are such that $n_0$ is preferably not more than two to three orders of magnitude greater than $n_2|E|^2$.

It should be understood that the refractive index $n_2$ may increase or decrease with intensity.

In a homogeneous medium the non-linear refractive index of the waveguide will cause a transverse optical field to disperse at low intensities but to collapse to a self-focussing singularity at high intensities. In other media, a self-defocussing non-linearity will occur where the refractive index decreases with intensity. The type of non-linearity depends upon the sign of the Kerr coefficient. In an inhomogeneous medium it is possible for guiding to occur before catastrophic self focussing occurs.

The device is operated in the following way for a waveguide with a self-focussing non-linearity; if a waveguide with a self-defocussing non-linearity is used then the words in brackets apply. At a frequency near to the fundamental mode cut-off the optical field is not well guided. At low (high) powers most of the power launched diffracts out into the cladding. As the intensity is increased the refractive index derived from the non-linearity causes the cut-off to move to lower (higher) frequencies. This means that the optical field at the operating frequency is more (less) guided than before and hence that less (more) power diffracts into the cladding. If the power confined in some central region is defined as the output power then we have a device whose output power is a non-linear function of the input power.

In other words the guiding/non-guiding property depends on the resultant refractive index experienced by the optical field.

Preferably all the media are non-linear.

Preferably, the device further comprises separation means associated with an output end of the waveguide whereby portions of optical signals leaving a core region of the output end are separated from other portions of the signals. By providing separation means, the variation of output power with input power just described can be utilised. Typically, the separation means may comprise a monomode optical fibre which, in the case where the optical waveguide comprises an optical fibre, is spliced to the optical waveguide. In this way, only that portion of the optical signal passing through the core of the optical waveguide is coupled into the monomode optical fibre as the output signal.

Conveniently, the device further comprises bias signal generating means, such as a laser, for injecting optical bias signal into the input end of the waveguide, the intensity of the bias signal being such that the waveguide operates in its non-linear region and the bias signal is cut-off. This enables the device to be used in a variety of applications. For example as a switch, the device, when biassed into its cut-off region, can be caused to switch on or off by applying a suitable switching signal in addition to the bias signal causing optical radiation to be guided or not respectively. The bias and the signal must be phase aligned.

The device can also be used as the basis of a logic element such as an AND gate in which a number of inputs (two or more) are applied to an input end of the optical waveguide and optical radiation is only received at an output end of the waveguide if the total incident intensity is sufficient to cause self-guiding to occur. It will be appreciated that in these applications the optical waveguide must have a suitable length. A device with a self-defocussing non-linearity could be used as the basis of a NAND gate.

Conveniently, the device further comprises coupling means such as a Y coupler, one input arm of the coupler being coupled with the bias signal generating means, the other input arm of the coupler being coupled with an input signal, and the output arm of the coupler being coupled with the waveguide.

BRIEF DESCRIPTION OF THE DRAWINGS

An example of an optical device and a method of operating the assembly according to the present invention will now be described with reference to the accompanying drawings, in which:

FIG. 4 illustrates graphically the way in which output power of an output optical signal varies with input power for three different optical fibre lengths; and;

DETAILED DESCRIPTION

Figure 1:
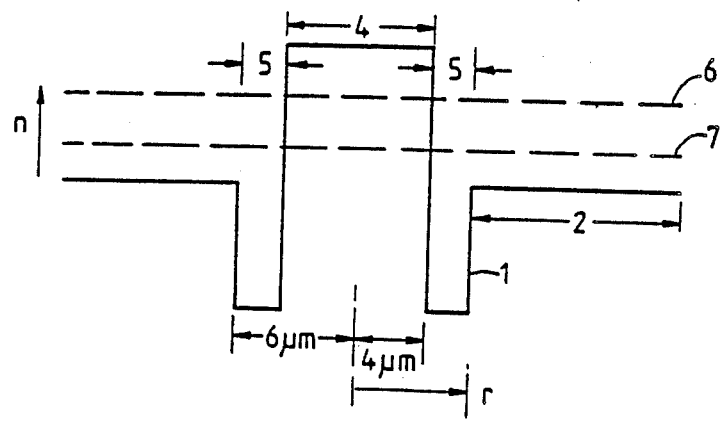
FIG. 1 illustrates the variation in refractive index across the diameter of an optical fibre having a W profile.

A typical W profile optical fibre has an outer cladding, a doped silica core with a refractive index higher than that of the outer cladding and an inner cladding with a refractive index lower than the outer cladding. An example of the variation of refractive index across a typical W profile optical fibre is shown by a line 1 in FIG. 1. Consider the example of two transverse optical fields having different wavelengths. Different proportions of these optical fields will travel through the central core region 4 and the inner cladding region 5 and the outer cladding region 2 of the optical fibre, so that the effective (or average) refractive index experienced by each field will be different. Thus, the effective refractive index ($n_{eff}$) experienced by one field will be as shown by the dashed line 6 in FIG. 1 while the effective refractive index experienced by another field will be as indicated by the dashed line 7. Thus, the effective index is the average index seen by the field which approaches the outer cladding index as the wavelength is increased.

Figure 2:
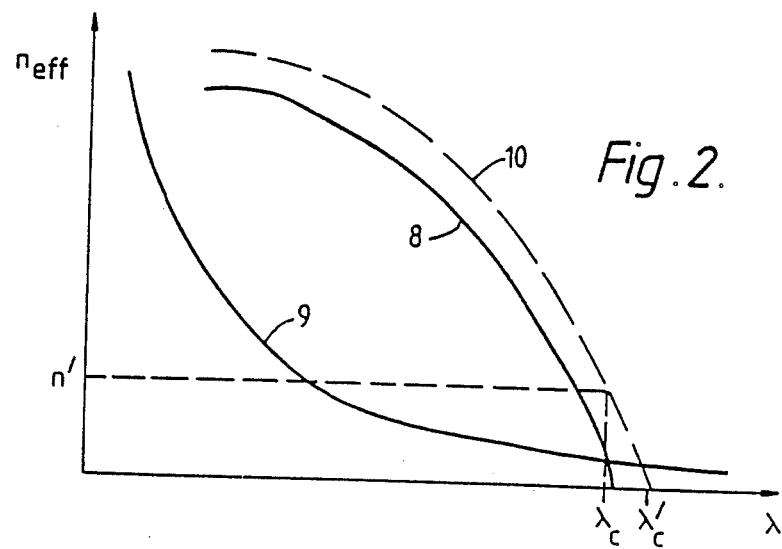
FIG. 2 illustrates the variation of effective refractive index with the transverse wavelength of incident optical radiation.

FIG. 2 illustrates the overall variation of effective refractive index with wavelength as indicated by a line 8. For comparison, a line 9 indicates the same variation but for an optical fibre which does not exhibit a fundamental mode cut-off. It will be seen in FIG. 2 that there is a particular wavelength $\lambda_c$ at which the effective refractive index is equal to the outer cladding index at which point propagation through the fibre ceases.

It has already been mentioned above that the optical fibre chosen has a non-linear refractive index. This means that the form of the profile shown in FIG. 1 can be varied by varying the intensity of the incident optical signal. The result of this is that the curve 8 shown in FIG. 2 can be shifted by, in the case of a self-focussing fibre, increasing the intensity of the injected optical radiation so that a new curve 10 is developed having a higher cut-off wavelength $\lambda'_c$. Thus, if optical radiation having a wavelength $\lambda_c$ is initially injected into the optical fibre at an intensity corresponding to that followed by the line 8 in FIG. 2 no transmission will occur. However, a small increase in that intensity will modify the refractive index and hence the effective refractive index of the optical fibre from its previous outer cladding value to a value (n') greater than the outer cladding value allowing the signal to be guided along the fibre. It is on this principle that the invention is based.

We have performed a theoretical analysis on propagation along a W profile fibre. To do this, we solved the scalar wave equation $$\nabla^2 E(xyz) + (k^2 n^2(r) - \beta^2) = 0$$

$$k = 2\pi/\lambda$$

for the continuous wave (c−w) electric field, E(z,x,y), where z is the propagation distance along the fibre, x and y the two transverse directions and $\lambda$ the wavelength, using the beam propagation method for the forward travelling wave. The refractive index $n(r, |E|^2)$ is given by $$n(r, |E|^2) = n_0 + n_2 \cdot |E(r)|^2,$$

where $n_0(r)$ is the fibre refractive index profile and $n_2$ is the Kerr coefficient.

In these calculations we imposed rectangular symmetry in order to use fast fourier cosine transforms to improve calculating efficiency. Experiments were made on the number of Fourier modes needed and on the integration step; the values chosen were adequate to give several figures accuracy for the calculations described here. We also checked that sufficient points were included to accurately represent bound modes of cylindrical symmetry. The calculations were carried out over a distance of 30 mm, using $(192)^2$ Fourier modes in a periodic box of sides 300 microns, and an integration step of 1.5 microns. At the input to the fibre we launched a beam profile given by the bound mode of a W-fibre with a similar shape, but a sufficiently high core refractive index to bind the mode.

Figure 3A:
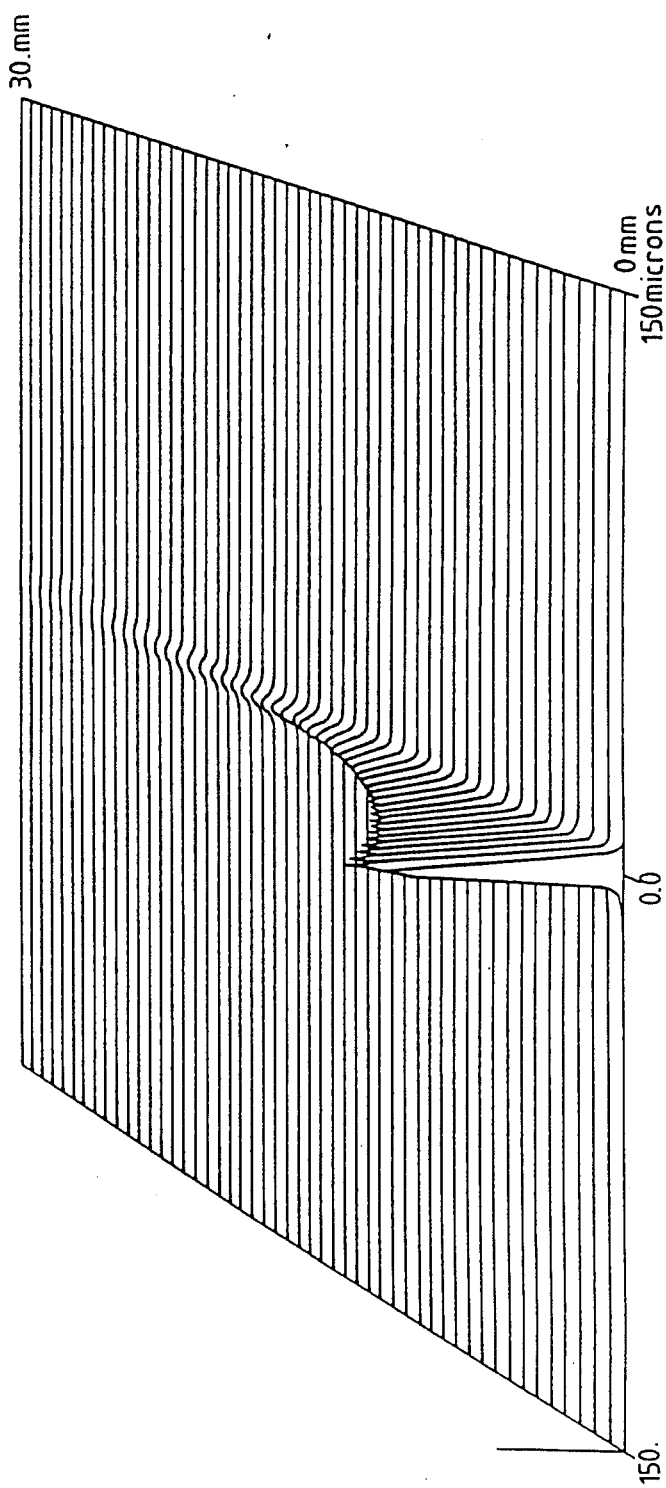
FIGS. 3a–3c illustrate the variation in intensity of a transmitted optical signal with three different initial intensities respectively.
Figure 3B:
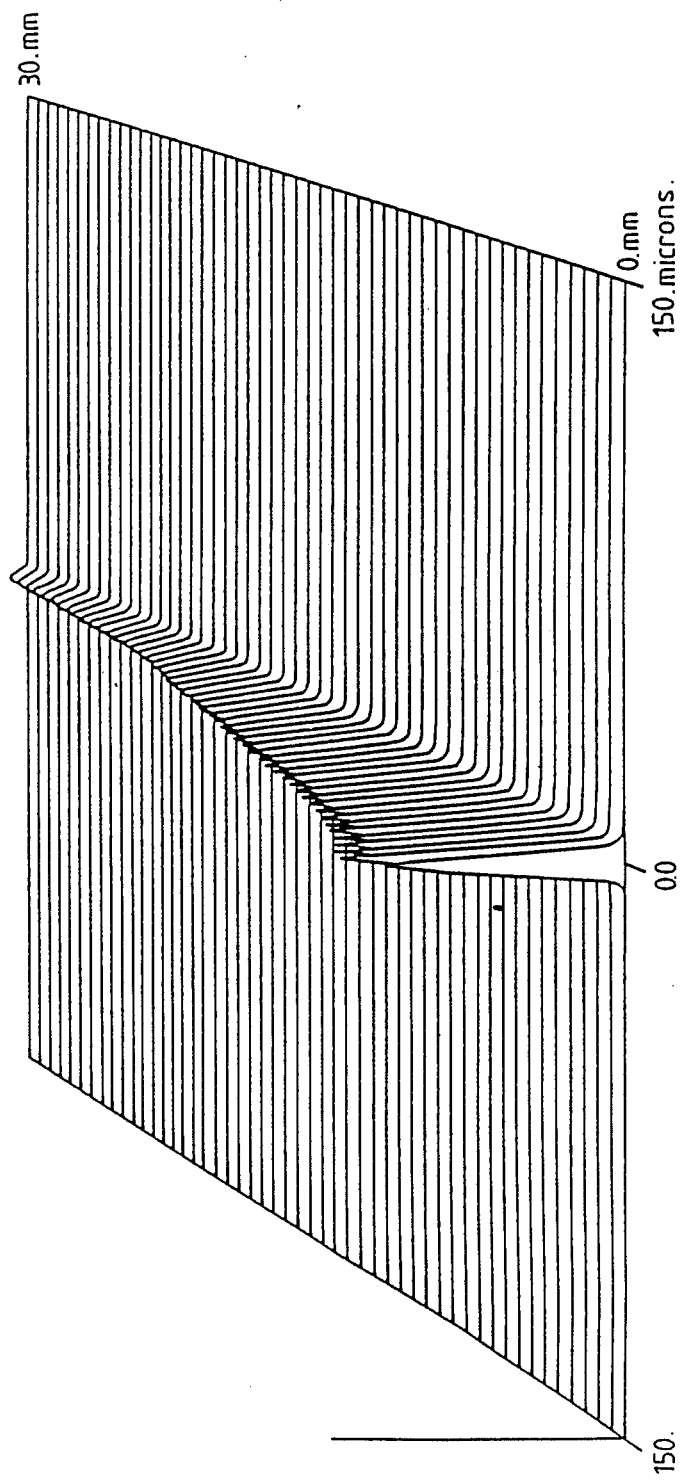
Figure 3C:
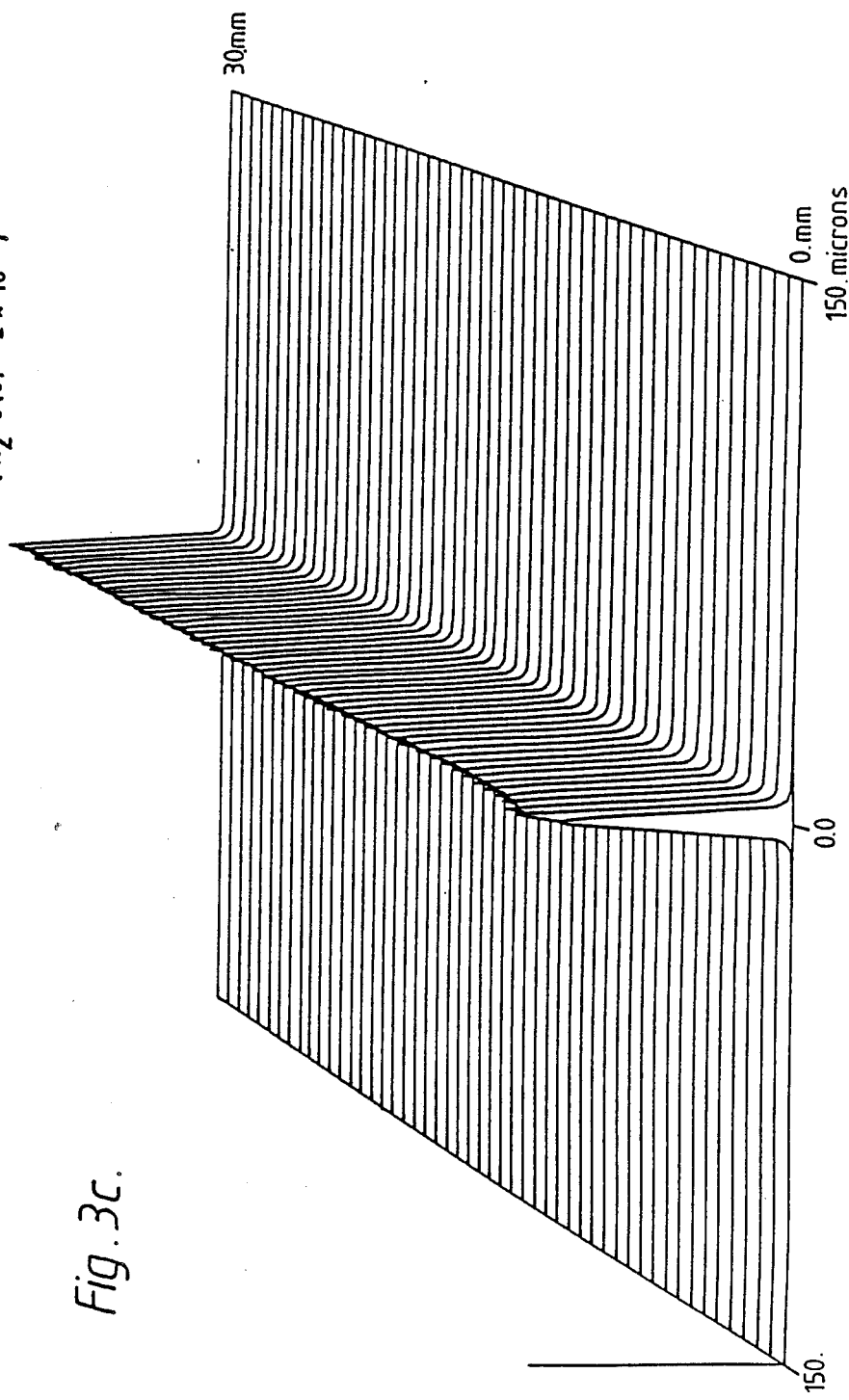

FIG. 3a shows how the beam intensity profile across the fibre diameter slowly diffracts out of the core with propagation down the fibre, for the linear case where $n_2=0$; FIGS. 3b and 3c show the profiles for higher launched power. As we have neglected loss in this problem, the total energy must be conserved. However, the amount within a finite radius from the centre reduces, as energy is diffracted into the cladding. The energy confined within a 10 micron radius decreases much more slowly than for a fibre with no structure in the refractive index (the beam would disperse in a distance of about a millimeter in a homogeneous fibre).

We then studied the effect of a nonlinear refractive index on this propagation. FIG. 4 shows the fraction of the launched energy still confined within a 10 micron radius for fibres 7.5 mm, 15 mm and 30 mm long as a function of $n_2 \cdot |E(0)|^2$. We can see from this figure that the fibre can be used as a threshold device. If the centre part of the beam were coupled into (say) a second standard momomode fibre then the fraction of the total energy launched into the propagating mode would depend on the input power.

Figure 5:
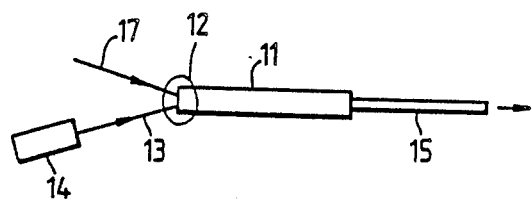
FIG. 5 illustrates schematically an example of the assembly.

An example of an assembly incorporating a W-profile fibre is shown in FIG. 5. In this example, a W profile optical fibre 11 is connected to a Y coupler 12. One of the input arms 13 of the Y coupler 12 is coupled with a laser 14 while the output arm of the coupler 12 is connected to the fibre 11. A momomode optical fibre 15 is spliced to the central core of the fibre 11.

When the assembly shown in FIG. 5 is to be used as an optical switch or amplifier, a bias optical signal is supplied from the laser 14 to the optical fibre 11. The intensity of the bias signal is selected to lie on the portion of the transmission power profile (FIG. 4) close to the step part of the profile. For example, for a 30 mm optical fibre, the bias intensity will be chosen to lie at about the position 16. By biassing the fibre at this position, a small control signal applied along the other input arm 17 of the Y coupler 12 will cause the total incident intensity to lie at a position towards the top of the graph shown in FIG. 4 resulting in a relatively high output power.

Typically, the transverse form of the bias signal alone will be similar to that of FIG. 3a. Thus, at the output end of the optical fibre 11 the energy is spread over a large area with a very small proportion within the central core region so that only a very small amount of the signal is coupled into the optical fibre 15. When a signal is supplied along the arm 17, this adds to the intensity of the bias signal to such an extent that the total intensity changes to, for example, the position 18 in FIG. 4. This causes the optical fibre 11 to switch into its self-guiding mode in which a large proportion of the initial total intensity is guided within the core to the output end of the fibre as shown in FIG. 3c. Thus, a large intensity signal is coupled into the optical fibre 15.

In another arrangement (not shown) the optical fibre 11 could be used as an AND circuit with two input signals being fed along the arms 13, 17 (laser 14 being omitted) so that only when signals of sufficient intensity are fed along both the arms 13, 17 is there sufficient intensity from the resultant signal for self-guiding to produce a large output power within the central core of the optical fibre 11.

I claim:

1. An optical device comprising:
    an optical waveguide responsive to the intensity of light incident thereon to guide or not guide an optical signal from an input end to an output end of said waveguide, said waveguide having a core region, an outer cladding region and at least one further region disposed therebetween which has a lower refractive index than said outer cladding region, at least one of said regions having a refractive index which varies with respect to the intensity of said incident light;
    coupling means including first and second input means for coupling at least two optical signals into said input end of said waveguide; and
    separation means for separating portions of optical signals leaving said core region at said output end of said waveguide from other portions of the signals travelling in said outer cladding region and said at least one further region.

2. A device according to claim 1, wherein the separation means comprises a monomode optical fibre.

3. A device according to any one of claims 1 or 2, further comprising bias signal generating means, connected, in use, to said coupling means, for injecting an optical bias signal into the input end of the waveguide, the intensity of the bias signal being such that the waveguide operates in its non-linear region and the bias signal is cut-off.

4. A device according to claim 3, wherein said coupling means operates to couple an input signal with the waveguide.

5. A device according to claim 4, wherein said coupling means comprises a Y coupler, and said first input means comprises one input arm of the coupler coupled with the bias signal generating means, and said second input means comprises the other input arm of the coupler coupled with said input signal, and the output arm of the coupler being coupled with the waveguide.

6. A device according to claim 1, wherein at least one of the regions disposed within said outer cladding has a refractive index which varies with respect to the intensity of said incident light.

7. A device according to claim 6, wherein all of the regions have a refractive index which varies with respect to the intensity of said incident light.

8. A device according to claim 7, wherein the waveguide comprises an optical fibre.

9. A device according to claim 8, wherein said fibre has a W refractive index profile.

10. A method of operating an optical device including an optical waveguide responsive to the intensity of light incident thereon to guide or not guide an optical signal from an input end to an output end of said waveguide, said waveguide having a core region, an outer cladding region and at least one further region disposed therebetween which has a lower refractive index than said outer cladding region, at least one of said regions having a refractive index which varies with respect to the intensity of said incident light; coupling means for coupling at least two optical signals into said input end of said waveguide; and separation means for separating portions of optical signals leaving said core region at said output end of said waveguide from other portions of the signals travelling in said outer cladding region and said at least one further region, said method comprising the steps of:
    injecting a first optical signal into said waveguide via said coupling means, said first signal having an intensity such that the first signal would be substantially cut-off by said waveguide and would not in isolation be guided by the waveguide; and
    injecting a second optical signal into the waveguide via said coupling means, said second signal having an intensity which is sufficient to cause said first and said second signals to be guided by the waveguide.

11. A method according to claim 10, including the step of separating portions of optical signals leaving said core using said separation means.

12. A method according to claim 11, wherein said separating step is performed using a monomode optical fibre as the separation means.

13. A method according to claim 10, wherein at least one of the regions disposed within said outer cladding has a refractive index which varies with respect to the intensity of said incident light.

14. A method according to claim 10, wherein all of the regions have a refractive index which varies with respect to the intensity of said incident light.

15. A method according to claim 14, wherein the waveguide comprises an optical fibre.

16. A method according to claim 15, wherein said fibre has a W refractive index profile.

17. A method according to claim 10, wherein said step of injecting a first optical signal includes the step of injecting an optical bias signal into the input end of the waveguide, the intensity of the bias signal being such that the waveguide operates in its non-linear region and the bias signal is cut-off.

18. A method according to claim 17, further including the step of coupling an input signal with the waveguide via said coupling means.

19. A method according to claim 18, wherein said coupling means comprises a Y coupler, having two input arms and an output arm, further including the steps of coupling said bias signal to one input arm of the coupler, coupling the input signal to the other input arm of the coupler, and coupling the output arm of the coupler to the waveguide.

* * * * *